United States Patent
Matta et al.

(10) Patent No.: US 7,099,283 B2
(45) Date of Patent: Aug. 29, 2006

(54) QUALITY OF SERVICE AWARE HANDOFF TRIGGER

(75) Inventors: Johnny M. Matta, San Jose, CA (US); Atsushi Takeshita, Sunnyvale, CA (US)

(73) Assignee: NTT Docomo, Inc., Tokyo (JP)

(*) Notice: Subject to any disclaimer, the term of this patent is extended or adjusted under 35 U.S.C. 154(b) by 854 days.

(21) Appl. No.: 10/056,576

(22) Filed: Jan. 25, 2002

(65) Prior Publication Data

US 2003/0142651 A1    Jul. 31, 2003

(51) Int. Cl.
*H04L 12/26* (2006.01)
*H04Q 7/20* (2006.01)

(52) U.S. Cl. .................. 370/252; 370/331; 455/439
(58) Field of Classification Search ............ 370/241, 370/252–253, 331–333, 338, 389, 400, 419; 455/439

See application file for complete search history.

(56) References Cited

U.S. PATENT DOCUMENTS

| | | | |
|---|---|---|---|
| 5,793,976 A * | 8/1998 | Chen et al. | 709/224 |
| 6,466,548 B1 * | 10/2002 | Fitzgerald | 370/249 |
| 6,594,268 B1 * | 7/2003 | Aukia et al. | 370/400 |
| 6,704,304 B1 * | 3/2004 | Gallagher et al. | 370/352 |
| 6,748,433 B1 * | 6/2004 | Yaakov | 709/224 |
| 6,798,745 B1 * | 9/2004 | Feinberg | 370/235 |
| 6,925,063 B1 * | 8/2005 | Goldshtein et al. | 370/252 |

OTHER PUBLICATIONS

Hać, A. and Peng, J. 2001. A two-phase combined QoS-based handoff scheme in a wireless ATM network. Int. J. Netw. Manag. 11, 5 (Sep. 2001), 309-330. DOI= http://dx.doi.org/10.1002/nem.413.*

Wu, J. C., Cheng, C., Ma, G., and Huang, N. 2001. Intelligent handoff for mobile wireless internet. Mob. Netw. Appl. 6, 1 (Jan. 2001), 67-79. DOI= http://dx.doi.org/10.1023/A:1009817921307.*

Li, B., Xu, D., and Nahrstedt, K. 2001. Towards integrated runtime solutions in QoS-aware middleware. In Proceedings of the 2001 international Workshop on Multimedia Middleware (Ottawa, Ontario, Canada). M3W. ACM Press, New York, NY, 11-14. DOI= http://do.*

Matthias Grossglauser, Jennifer Rexford, *Traffic Measurement for Network Operations*, ACM SIGCOMM 2001 tutorial, Aug. 2001.

(Continued)

*Primary Examiner*—Chau Nguyen
*Assistant Examiner*—Kerri M. Dyke
(74) *Attorney, Agent, or Firm*—Blakely, Sokoloff, Taylor & Zafman LLP (57) ABSTRACT

A method of estimating QoS for making a handoff trigger decision for a remote terminal in a wireless IP network is disclosed. At least a first and second probing packet is generated with an access router from a plurality of access points. The first and second probing packets are then sent from the access routers over a fixed core network having a plurality of routers to a correspondent access router and then back to the access routers. At least one collector packet is also generated and sent to follow the first and second probing packets to gather at least one predetermined QoS parameter from the routers after the first and second probing packets have left the routers. The QoS parameters are then processed with the access routers to make the handoff trigger decision preferentially along with layer two QoS parameters of the wireless hop.

54 Claims, 5 Drawing Sheets

OTHER PUBLICATIONS

SLAC, *Passive and Active Monitoring on a High-performance Network*, www.slac.stanford.edu/grp/scs/net/talk/pam-apr01/, 2001. 35 Power Point slides.

Kevin Lai, Mary Baker, *Measuring Link Bandwidth Using a Deterministic Model of Packet Delay*, Talk at ACM SIGCOMM 2000. 15 Power Point slides.

Van Jacobson, *Pathchar Notes*, htpp://www.caida.org/tools/utilities/others/pathchar/pathcharnotes.html, 1997.

Van Jacobson, *Pathchar—A Tool to Infer Characteristics of Internet Paths*, Presentation at Lawrence Berkeley National Laboratory, Apr. 1997.

Allen B. Downey, *Using Pathchar to Estimate Internet Links Characteristics*, In Proceedings of ACM SIGCOMM, 1999.

Constantinos Dovrolis, Parameswaran Ramanahan, David Moore, *What do packet dispersion techniques measure?*, IEEE Infocom 2001.

Mansour J. Karam, Fouad A. Tobagi, *Analysis of the Delay and Jitter of Voice Traffic Over the Internet*, In Proceedings of IEEE Infocom 2001.

Kevin Lai, Mary Baker, *Measuring Link Bandwidths Using a Deterministic Model of Packet Delay*, In Proceedings of ACM SIGCOMM, Aug. 2000.

Telecommunications and Internet Protocol Harmonization Over Networks (TIPHON), *The Signaling and Control of End-to-end Quality of Service in TIPHON Systems*, Draft TS 101 329-3 v2.1.1, Technical Specification, Sep. 2000.

Kevin Lai, Mary Baker, *Nettimer: A tool for Measuring Bottleneck Link Bandwidth*, In proceedings of the 3$^{rd}$ USENIX Symposium on Internet Technologies and Systems, Mar. 2001.

\* cited by examiner

| Probe 1 | | Probe 2 | | Routers | |
|---|---|---|---|---|---|
| Field 1 | Field 2 | Field 3 | Field 4 | Field 5 | Field 6 |
| $\sum_{i=0}^{I-1} q_i^{probe_1}$ | Max: $\hat{q}_i^{voice} + s^{probe_1}/B_i$ $i=0,\ldots,I-1$ | $\sum_{i=0}^{I-1} q_i^{probe_2}$ | Max: $\hat{q}_i^{voice} + s^{probe_2}/B_i$ $i=0,\ldots,I-1$ | $\sum_{i=0}^{I-1} \hat{q}_i^{voice}$ | $\sum_{i=1}^{I-1} \hat{\Delta} q_i^{voice}$ |

FIG. 4

| Router (l) | | | |
|---|---|---|---|
| Forward | $\hat{q}_l^{voice}$ | $q_{l\,previous}^{voice}$ | $\hat{\Delta} q_l^{voice}$ |
| Reverse | $\hat{q}_l^{voice}$ | $q_{l\,previous}^{voice}$ | $\hat{\Delta} q_l^{voice}$ |

FIG. 5

| | Probe Queueing Delay | Transmission Delay |
|---|---|---|
| Probe 1 | $q_l^{probe_1}$ | $(s^{probe_1}/B_l)$ |
| Probe 2 | $q_l^{probe_2}$ | $(s^{probe_2}/B_l)$ |

FIG. 6

|  | Inferred From Probe 1 | | Inferred From Probe 2 | | Network | Network |
|---|---|---|---|---|---|---|
|  | Field 1 | Field 2 | Field 3 | Field 4 | Field 5 | Field 6 |
| Forward Collector | $\sum_{i=0}^{I-1} q_i^{probe_1}$ | Max: $\hat{q}_i^{voice} + s^{probe_1}/B_i$ $i=0,...,I-1$ | $\sum_{i=0}^{I-1} q_i^{probe_2}$ | Max: $\hat{q}_i^{voice} + s^{probe_2}/B_i$ $i=0,...,I-1$ | $\sum_{i=0}^{I-1} \hat{q}_i^{voice}$ | $\sum_{i=0}^{I-1} \hat{\Delta} \hat{q}_i^{voice}$ |
| Reverse Collector | $\sum_{i=0}^{I-1} q_i^{probe_1}$ | Max: $\hat{q}_i^{voice} + s^{probe_1}/B_i$ $i=0,...,I-1$ | $\sum_{i=0}^{I-1} q_i^{probe_2}$ | Max: $\hat{q}_i^{voice} + s^{probe_2}/B_i$ $i=0,...,I-1$ | $\sum_{i=0}^{I-1} \hat{q}_i^{voice}$ | $\sum_{i=0}^{I-1} \hat{\Delta} \hat{q}_i^{voice}$ |

FIG. 7

|  | Probe 1 | Probe 2 |
|---|---|---|
| Departure Time (From AR) | $T_{AR}^{probe_1}$ | $T_{AR}^{probe_2}$ |
| RTT (Round-Trip Time) | $RRT_{probe_1}$ | $RRT_{probe_2}$ |
| Arrival Time (At Correspondent Node) | $t_{CN}^{probe_1}$ | $t_{CN}^{probe_2}$ |
| Departure Time (From Correspondent Node) | $T_{CN}^{probe_1}$ | $T_{CN}^{probe_2}$ |
| Arrival Time (At AR) | $t_{AR}^{probe_1}$ | $t_{AR}^{probe_2}$ |

FIG. 8

| Delay (Δ) | $\tau_{total} = \tau_0 + \tau_1 + \ldots + \tau_{I-1}$ |
|---|---|
| Jitter (Δτ) | $\Delta\tau_{total} = \sqrt{(\Delta\tau_0)^2 + (\Delta\tau_1)^2 + \ldots + (\Delta\tau_{I-1})^2}$ |
| Bandwidth (B) | $B_{total} = \{\min(B_i); i = 0, \ldots, (I-1)\}$ |
| Packet Loss (L) | $L_{total} = 1 - [(1 - L_0) \times (1 - L_1) \times \ldots \times (1 - L_{I-1})]$ |

FIG. 9

| Phase 1: End-to-end QoS Estimation | Router Monitoring | | Probing | Processing | L2+L3 Combining |
|---|---|---|---|---|---|
| | Queuing Estimate Updating | Jitter Estimate Updating | | | |

| Phase 2: AR/AP Selection | QoS Ranking | | QoS Classification | Load Balancing | Cost-Awareness | User Preferences |
|---|---|---|---|---|---|---|
| | Weighting-Based | Perception-Based | | | | |

FIG. 10

QUALITY OF SERVICE AWARE HANDOFF TRIGGER

FIELD OF THE INVENTION

The present invention relates generally to wireless communication networks and more particularly to a quality of service aware handoff trigger for wireless communication devices.

BACKGROUND OF THE INVENTION

Quality of service (QoS) after handoff for networks with Internet Protocol (IP) based backbones has been receiving increased interest in the networking research community. IP networks were originally not designed to provide QoS support and this handicap is even more significant for mobile networks. Real-time applications such as voice over IP (VoIP) are particularly sensitive to QoS and have stringent QoS requirements. Therefore, it is important to ensure adequate performance on such metrics as latency, packet loss, packet jitter and that an adequate amount of bandwidth are provided after handoff.

Existing core network QoS probing tools can be divided into two categories: passive and active probing techniques. Passive QoS estimation techniques generally consist of techniques that collect IP packets on one or more links and record IP, TCP/UDP, or application-layer traces. These use existing traffic on the network and do not inject additional probing packets into the network. The passive monitoring approach has the advantage of not injecting additional probing traffic into the network. It observes the network as it is, meaning that the measurements are an assessment of true network behavior, since this latter is not disturbed by probing traffic intended for those measurements.

The monitoring can take different levels of granularity depending on the degree of processing, storage and resources available. Packet monitoring allows observation of packet-by-packet information such as packet delay variation, packet size distribution, and throughput between host pairs. Higher-level measurements, with less overhead, can be achieved by flow level measurements that record the total number of bytes transferred, the flow start and finish time, among others.

As previously set forth, the main advantage of passive probing techniques is that they do not introduce a load on the network they monitor, which also means they do not distort the network traffic and therefore produce realistic estimates. However their handicap is that they rely on existing traffic, which is not guaranteed to have desired characteristics for certain measurements. For example, bottleneck bandwidth passive measurement techniques require a certain packet size distribution and inter-packet departure rate often not met, which is the case for VoIP traffic. As it relates to the present invention, traffic is not guaranteed to exist through base station candidates at handoff time to the desired correspondent destination and as such relying on passive monitoring is therefore inappropriate.

Active QoS estimation consist of techniques that actively inject measurement traffic into the network and compute metrics based on the received traffic at the receiver or the sender (round-trip or sender response). Active monitoring allows shaping the measurement traffic to approximate user experience as much as possible. The disadvantage of active monitoring is that it sometimes adds a significant overhead to the network in terms of traffic and processing, which may also lead to a distortion of the estimates of network behavior.

Active monitoring techniques can be generally categorized into two groups: Internet Control Message Protocol (ICMP) based and packet pair/train approaches.

The underlying concept used in the ICMP-based approach is that a packet sent with a time-to-live (TTL) equal to n will cause router n on the path to identify itself since it will send back an ICMP_time_exceeded message to the sender. A tool referred to as Pathchar is one of the earliest tools based on this technique. For each TTL number, Pathchar sends packets with varying sizes and observes their one-way delay (half the observed round trip time). By successively increasing the TTL, successive hops on the path are unraveled and recursive subtractions of delays allow link-by-link QoS inference for delay, packet loss, bandwidth and queue time.

The problem with Pathchar is the large amount of overhead it requires. For example, 10 MB of data are required to measure a 10-hop Ethernet path bandwidth. This approach is overkill for the purpose of the present invention since QoS estimation is required to occur through several base stations for the handoff of each wireless terminal. As such, the Pathchar tool does not provide an optimal method of providing a QoS aware handoff trigger for VoIP applications.

As set forth above, the other active monitoring technique is the packet-pair/train approach. Its main purpose is to obtain the bottleneck bandwidth, which is the link with the lowest transmission rate. This approach consists of sending two packets or packet trains (several packets) through the path and inferring bottleneck bandwidth from packet inter-arrival times. In this approach the following underlying assumptions are made: 1) the first packet does not experience queuing; and 2) following packets queue one after another at the bottleneck link and at no other subsequent link.

If the assumptions are satisfied, packet inter-arrival times will be proportional to the transmission rate of the bottleneck. Cross traffic can cause the assumptions to be violated by causing undesirable queuing or preventing probe packets from queuing after each other at the bottleneck. Filtering techniques have been proposed to work around distortions in measurements due to cross-traffic.

Voice applications will continue to be a major service of interest among wireless subscribers in future generation networks and as such, a primary concern among wireless communication providers is to define techniques capable of supporting QoS requirements upon handoff time. As such, a need exists for providing QoS to an IP-based core network that assesses QoS performance through a fixed core network hop. In addition, a need exists for a method of combining the result with wireless hop signal power and signal-to-noise ratio (SNR) figures to assess the QoS on the end-to-end path.

SUMMARY OF THE PRESENT INVENTION

The present invention relates to a method of producing QoS estimates for the purpose of making a handoff trigger decision. The QoS estimates are used as the inputs to a base station selection algorithm as well as a load-balancing component that is added to that algorithm. The present invention also introduces optimization and tuning to complete the overall triggering mechanism. The decision to initiate a handoff trigger relates to the QoS for the desired application perceived through the current base station. The QoS estimation technique is used on a regular basis to poll the current transmission path and rank its performance based on a QoS analysis. A result below a predefined threshold will initiate the trigger algorithm, which leads to probing through different base stations within radio range of the remote terminal.

As briefly outlined above, a preferred embodiment of the present invention discloses a method of estimating QoS for making a handoff trigger decision for a remote terminal in a wireless IP network. In the preferred embodiment, a first and second probing packet is generated from each access router connected to an access point within radio range of the mobile terminal. The first and second probing packets are then sent from the access routers over a fixed core network having a plurality of routers to a correspondent access router and then back to their originating access routers. A collector packet follows the first and second probing packets to gather at least one predetermined QoS parameter from the routers after the first and second probing packets leave the respective routers. The QoS parameters are then processed at the access routers by algorithms in order to make the handoff trigger decision. The access point providing the best QoS to the remote terminal for its particular application will be designated to receive the handoff from this estimation process.

The collector packets preferentially include a forward collector packet that is used to gather QoS parameters from the routers while the first and second probing packets are traveling across the fixed core network from the access router to the correspondent access router. The first and second probing packets are used to generate the QoS parameters that are gathered by the collector packet. Preferentially, a reverse collector packet is used to gather the QoS parameters from the routers while the first and second probing packets travel back from the correspondent access router to the access router in which they originated.

The forward and reverse collector packets are preferentially used to record a packet queuing delay based on each probing packet at each router, a packet transmission time based on each probing packet at each router, a cumulated sum of queuing delays experienced by the first and second probing packets at each respective router, a transmission time of the first and second probing packets from the respective routers and a cumulated sum of the current packet queuing delay experienced at the routers by the first and second probing packets.

In the preferred embodiment of the present invention, the QoS parameters that are collected are used to estimate one-way packet delay to form a basis for the handoff trigger decision. The QoS parameters that are collected are also used to estimate the available bandwidth, which refers to the length of time from the moment the last bit of the packet arrives at a link until its last bit leaves that link. Further, the QoS parameters are used to estimate packet jitter, which refers to packet inter-arrival times, to form a basis for the handoff trigger decision.

In the preferred embodiment, at least one layer two QoS parameter may also be considered from the access point to the remote terminal when making the handoff trigger decision. The layer two QoS parameters may be selected from a group of parameters consisting of bit error rate and signal-to-noise ration. Further, each access point not having a signal strength above an acceptable predetermined threshold can be removed from consideration when making the handoff trigger decision and the corresponding fixed core hop from the corresponding access router to the destination will not be subject to QoS estimation.

Although the present invention has been described as it relates to making a handoff trigger decision in an all IP wireless network. Those skilled in the art should recognize that the present invention could also be used in network administration and monitoring as well. As such, the present invention should not be viewed as specifically limited to QoS estimation in all IP wireless networks.

Further objects and advantages of the present invention will be apparent from the following description, reference being made to the accompanying drawings wherein preferred embodiments of the invention are clearly illustrated.

DETAILED DESCRIPTION OF THE PRESENTLY PREFERRED EMBODIMENTS OF THE INVENTION

Figure 1:
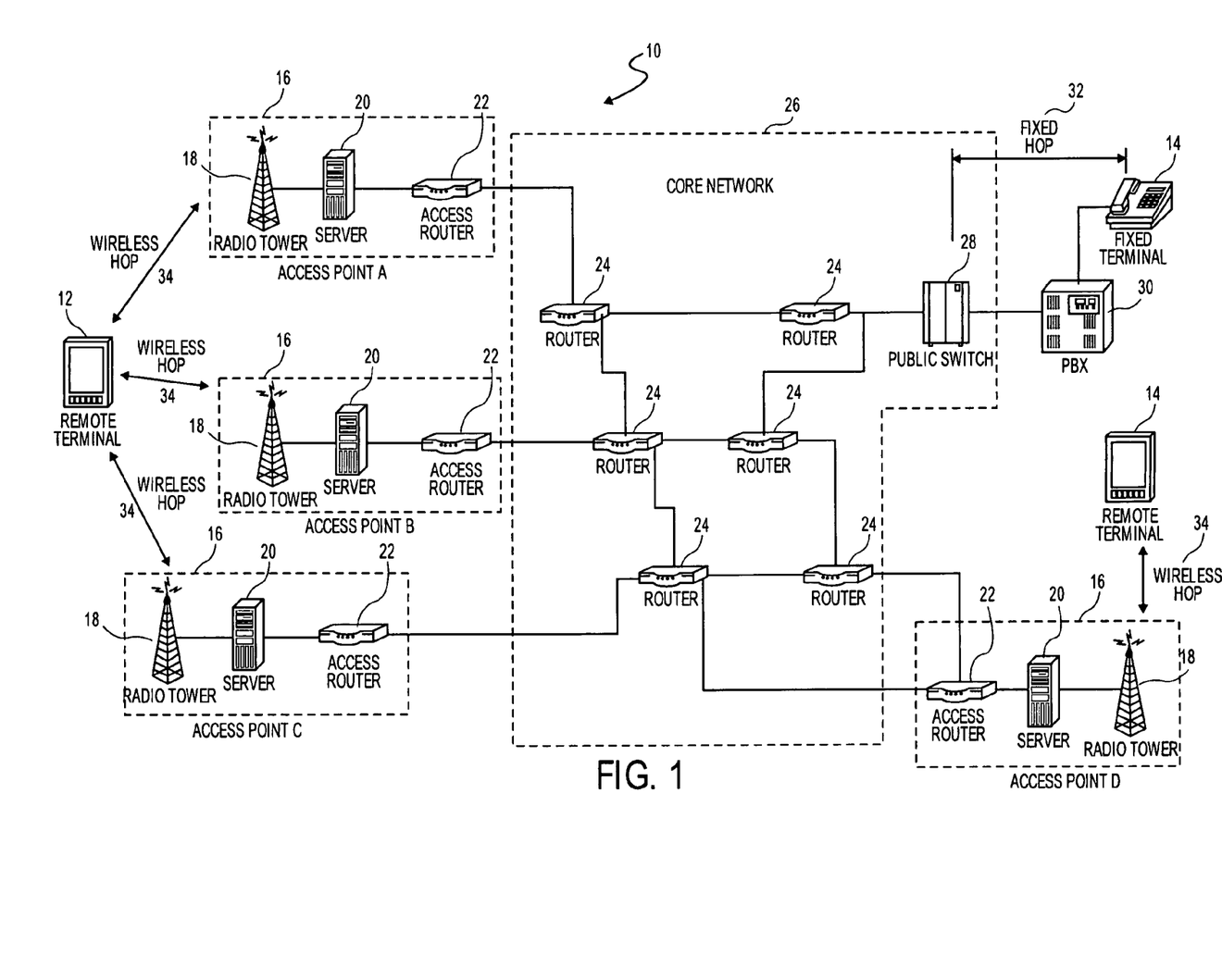
FIG. 1 depicts an example of a preferred wireless IP network.

Referring to FIG. 1, a wireless IP network 10 is generally illustrated that includes at least one remote terminal 12 and a plurality of correspondent nodes 14. The remote terminal 12 is illustrated as a voice enabled personal digital assistant (PDA) in FIG. 1, but those skilled in the art would recognize that other remote terminals such as wireless telephones may be used on the wireless IP network 10. As such, the depiction of a voice enabled PDA in FIG. 1 should be viewed in an illustrative sense and not as a limitation of the present invention. Further, the correspondent nodes 14 are illustrated in FIG. 1 as a fixed terminal and as a remote terminal to demonstrate the various types of communication devices that might be connected to the wireless IP network 10.

As illustrated, the remote terminal 12 is connected to a base station 16 that preferentially includes a radio tower 18, a server 20 and an access router 22. The radio tower 18 is connected to the server 20, which is in turn connected to the access router 22. During operation, the radio tower 18 is used to conduct radio communication between the remote terminal 12 and the server 20. The access routers 22 are used to send and receive IP packets over the wireless IP network 10 that contain voice data.

As further illustrated in FIG. 1, each access router 22 is connected to at least one router 24, which are also used to transmit packets over the wireless IP network 10. In reality, there is no functional difference between the access routers 22 and the routers 24 however; the access routers 22 are designated separately in FIG. 1 to indicate their association with each particular base station 16. In the preferred embodiment, each radio tower 18 and server 20 constitutes an access point that includes an access router 22, which can also be referred to as an access point/access router pair. Those skilled in the art would recognize that when packets are transmitted over an IP network they can make several "hops" from router to router before arriving at a respective correspondent node 14. As used herein, a "hop" is a term of art that is used to refer to packets traveling from one respective router 22, 24 to another.

The wireless IP network 10 illustrated in FIG. 1 includes a core network 26, which is used herein broadly to refer to the various network components that are used to interconnect access points to correspondent nodes 14. Those skilled in the art would recognize that several different network components could be used to interconnect the various components that make up the wireless IP network 10. Referring to FIG. 1, a public switch 28 can be connected to a private branch exchange 30 that is connected to a respective correspondent node 14, which is illustrated as a fixed terminal. In this example, the correspondent node 14 which is set forth as a remote terminal 14, is connected to the core network 26 via a fixed or wired hop 32. In the second example, the correspondent node 14 is connected to the core network 26 through an access point, which represents a wireless hop 34.

Bandwidth is a term used to refer to the serialization speed a device, such as remote terminal 12, is capable of obtaining on a network link. The term bottleneck bandwidth is used to refer to the lowest transmission capability among links on the entire path of the wireless IP network 10. Estimating the bottleneck bandwidth, with respect to VoIP applications, as well as others, is important because it can affect the QoS experienced by the remote terminal 12 during operation. For a detailed understanding of the present invention, it is important to understand how bottleneck bandwidth estimation techniques are used for networks.

Bottleneck bandwidth estimation techniques estimate the total bandwidth of the bottleneck rather than the available bandwidth. The difference can be quite significant since total bandwidth refers to the capacity each flow has when it has full control of the link whereas the available bandwidth will depend on the length of time from the moment the last bit of the packet arrives at the link until its last bit leaves that link. In the event of cross-traffic, that delay will include waiting in the queue for other packets to be transmitted. With no cross-traffic, either from packets within the same flow (intra-flow queuing) or packets from other flows (inter-flow queuing), total bandwidth will be equal to available bandwidth.

Figure 2:
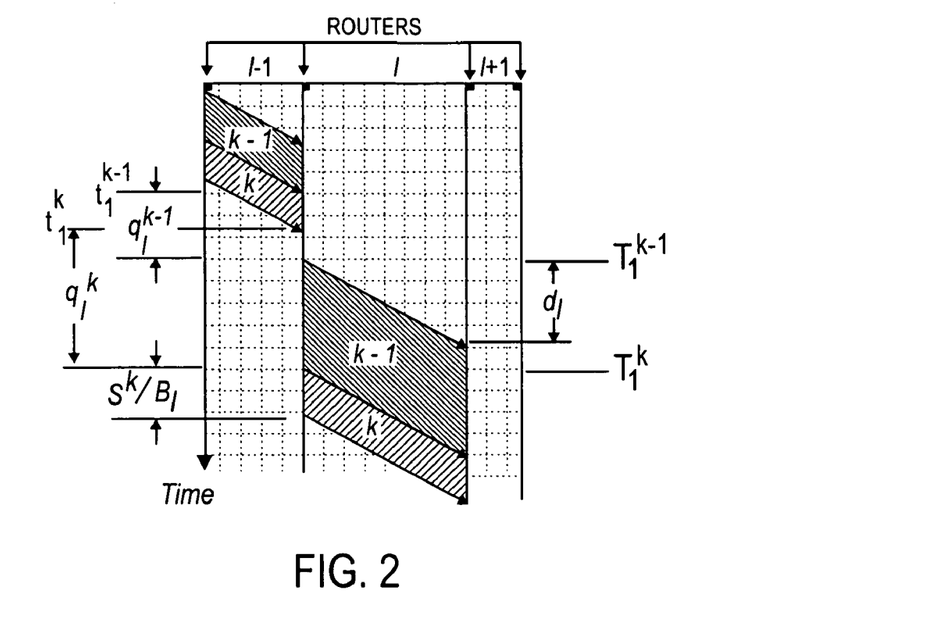
FIG. 2 depicts a packet transmission graph that illustrates intra and inter-flow queuing.

Referring generally to FIG. 2, packets (k) and (k-1) belong to the same flow. The delay, which is represented by $$(T_l^{k-1} - t_l^k)$$

is the inter-flow queuing time experienced by packet (k) at link (1), which means the waiting time of packet (k) for packets from other flows to be transmitted. The equation $$(T_l^k - T_l^{k-1})$$

represents the intra-flow queuing time of packet (k) at link (1), meaning the waiting time of packet (k) for packet (k-1) to be transmitted from link (1). The total queuing time, which is $(T_l^k - t_l^k)$, is the total queuing time of packet (k) at link (1) and is denoted as $q_l^k$ in FIG. 2. As such, the available bandwidth experienced by packet (k) at link (1) is represented as:

$$Bav_l^k = s^k / (s^k / B_l + q_l^k) \quad (1)$$

In the absence of queuing time, the available bandwidth is equal to total bandwidth of the link.

The variable l in FIG. 2 is used to represent the last link on the path the packet is traveling. The arrival time of packet (k) at link (1) is represented by $t_l^k$ and the queuing delay of packet (k) at link (1) is represented by $q_l^k$. The propagation delay associated with link (1) is represented by $d_l$. The transmission start time of packet (k) at link (1) is represented by $T_l^k$, wherein $T_l^k = q_l^k + t_l^k$. The size in bits of packet k is represented by $s^k$ and the total bandwidth of link (1) is represented by $B_l$. The superscript in the equations represents the packet number and the subscript is the hop number.

Any average has to be defined over a time scale and in the present invention the maximum resolution possible is used, meaning the total time needed for the transmission of one packet. Higher-level, but less accurate time scales could extend over several packets or an entire flow, but they will be less representative of actual performance as perceived by the user of the remote terminal 12. The present invention measures the available bandwidth instead of the total bandwidth, since this is the throughput actually available to the application. It is important to note however that cross traffic from other flows and traffic from the same flow as the application of interest will cause the available bandwidth to vary significantly over time.

Figure 3:
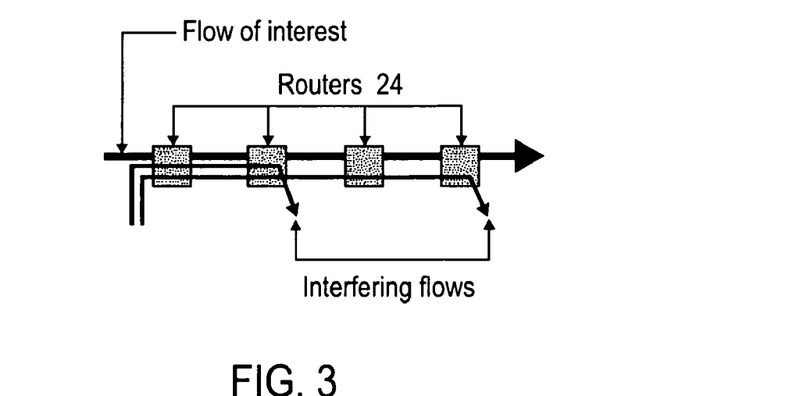
FIG. 3 depicts how inter-flows affect the flow of packets of interest through routers.

The effect of inter-flow queuing is generally illustrated in FIG. 3. As illustrated, it can be seen that the flow of the application of interest shares resources at intermediate routers 24 with other flows that are different at various hops. These interfering flows cause packets from the desired flow to queue and the queuing time length relates to the arrival pattern and packet size distribution of interfering packet flows.

Another important factor the present invention is designed to deal with to improve QoS is one-way packet delay. One-way packet delay refers to the latency in packet transmission from the time instant its first bit leaves the sender until the last bit arrives at the destination, which depends on several components broadly defined in terms of processing time at the sender, the receiver and intermediate hops, transmission delay, propagation delay and queuing after other packets at each hop. The generalized one-way packet delay model is expressed by the following equation:

$$t_l^k = A + t_0^k + \sum_{i=0}^{l-1} (s^k / B_i + d_i + q_i^k) \quad (2)$$

Where A is a constant value identical for all packets of the same size for the same application such as processing time at the sender, receiver and intermediate hops, framing and deframing of digitized signals for voice applications, etc. The queuing delay $q_i^k$ of packet (k) at link (i) is comprised of both inter-flow queuing time, meaning the waiting time of packet (k) for packets from other flows to be transmitted and also intra-flow queuing time, meaning the waiting time of packet (k) for packet (k-1) to be transmitted from link (i). See FIGS. 2 and 3.

Another factor affecting QoS is packet jitter, which represents packet inter-arrival time and is a random variable that is not average. Jitter can have two definitions:

1) Jitter is equal to packet inter arrival time, as such it is the random variable reflecting the variability in inter-arrival delay of successive packets from the same flow and as such is defined by:

$$\Delta t_l^{k,(k-1)} = \quad (3a)$$

$$t_l^k - t_l^{k-1} = t_0^k - t_0^{k-1} + \sum_{i=0}^{l-1}(q_i^k - q_i^{k-1}) = t_0^k - t_0^{k-1} + \sum_{i=0}^{l-1}\Delta q_i^{k,k-1}$$

Where $$\Delta q_i^{k,k-1}$$

is the difference in the queuing delays of packets (k) and (k-1) at hop (i).

2) Jitter=Variance of packet latency (which is equivalent to the variance of packet inter-arrival time) and is identified by:

$$\Delta t_l^k = \sqrt{\sum_{r=1}^{k}(t_l^r)^2/k - \left[\left(\sum_{r=1}^{k}t_l^r\right)/k\right]^2} \quad (3b)$$

Where $\Delta t_l^k$ is the $k^{th}$ estimate of jitter at hop (1). Equations (3a) and (3b) assume packets (k) and (k-1) have same size $s^k=s^{k-1}$. It also assumes successive packets (k) and (k-1) follow the same path such that bandwidth B and propagation delay d is the same at intermediate hops.

To estimate end-to-end QoS from the remote terminal 12 to the correspondent node 14, the present invention estimates QoS performance by probing the fixed core network 26 and then combining the results with layer 2 QoS measurements from the wireless hop, which is the hop from the base station 16 to the remote terminal 12. The results are combined at each respective access router 22 that is associated with a particular base station 16. A detailed description of how the present invention probes the fixed core network 26 for performance estimation is set forth in detail below.

As a first step to end-to-end QoS quantification, the present invention conducts probing from each candidate access router 22 to the correspondent node 14, regardless of whether the correspondent node 14 is a fixed terminal (e.g.—telephone) or a wireless device. Since the present invention deals with making a handoff trigger decision, those skilled in the art should recognize that several candidate access points, which have candidate access routers 22 associated with them, implement the probing step. If the correspondent node 14 is a wireless device, the end-to-end QoS quantification takes place from access router 22 to access router 22, respectively. In the case of a fixed correspondent node 14, probing will take place from access router 22 that is connected to remote terminal 12 all the way to correspondent node.

The essence of the preferred method disclosed by the present invention is that the only variable component in the link available bandwidth (1), packet delay (2) and packet jitter (3) equations set forth above is the queuing delay experienced by packets. In equation (1), both packet size $s^k$ and link bandwidth $B_l$ are constant and identical for all packets. The queuing delay $q_i^k$ is the only variable element. Equation (2) indicates that the one-way delay of a packet has a constant component residing in $(A+t_0^k)$. Also, packets of the same size taking the same path will have an identical component in $$\sum_{i=0}^{l-1}(s^k/B_i + d_i).$$

. It follows that the only variable parameter is again queuing delay. Finally, equation (3) includes a constant component equal to the difference in packet departure times and again a variable component in queuing time differences.

Active probing techniques all suffer from a basic limitation: they are only as good as the number of probes sent. Obviously, confidence in QoS estimates do not always increase linearly with the number of probes sent, but typically it is thought that a high number of probes are required to achieve as accurate a result as possible and make the estimate significant for the desired use. In the past, the question of how many probes to send has been difficult to answer in general and have only been based on loose approximations of traffic patterns and distributions.

The problem with the number of probes to use is two-fold. Under general considerations, the higher the number of probes, the higher the burden on the wireless IP network 10. It is vital to avoid stressing network resources, and even worse affecting the very traffic and performance the present invention is trying to quantify. In addition, this end-to-end QoS estimation technique is done to determine handoff triggering and as such, there is a limited amount of time to perform the estimation since it has to take place during base station 16 coverage overlap and possibly under fast user movement. It is estimated the time available to make the handoff triggering decision will be between approximately 1 to 3 seconds in future generation All-IP networks. The present invention deals with all of the above-referenced issues by using only a few packets in the fastest way possible to make the handoff triggering decision.

A preferred embodiment of the present invention sends probing packets through the core network 26, not with the intention of inferring QoS performance only by monitoring their transmission characteristics, but also by having the probing packets collect statistics already available in the routers 24 on the end-to-end path. The QoS parameter equations as a function of queuing show that once the constant part of these expressions is known, only the queuing delay variation will be needed to characterize performance. As set forth in greater detail below, the present invention uses two probing packets that are sent to quantify the invariable elements of the QoS parameter equations (1), (2) and (3). The variable queuing delay will be estimated at the routers 24 and the results collected by forward and reverse collector packets.

Each respective router 24 in the preferred wireless IP network 10 is required to maintain an updated estimate of the queuing time for packets of different traffic categories, such as voice, video, or even web browsing, if required. Each packet is monitored for its queuing time in router buffers from arrival time of the last bit of the packet to departure time of that last bit. Clock issues are not of relevance in this case since time is measured as differences, all that is needed is for the router clocks to run approximately at the same speed as the "true" clock. Each router 24 preferentially maintains a memory slot for each traffic category that it updates with each new measurement of packet queuing time for the corresponding category.

For example, in the preferred embodiment of the present invention the update function used for voice at router (1) is represented as:

$$\hat{q}_l^{voice} = a \times \hat{q}_{l_{old}}^{voice} + (1 - \alpha) \times q_l^{voice} \quad (4)$$

Where:

$$\hat{q}_l^{voice}$$

is the new estimate to be stored by router (1) for voice packet queuing times;

$$\hat{q}_{l_{old}}^{voice}$$

is the previously stored estimate of voice packet queuing time at router (1);

$$q_l^{voice}$$

is the last observed queuing time for a voice packet at router (1); and α is the tuning factor such that a larger α value gives more weight to the old estimate, leading to slower sensibility to fast variations. Smaller α values yield faster response to queuing time variations but also less stability in the estimate.

Each router 24 is also required to keep track of interpacket arrival time for packets from the same traffic category. This requires two memory slots per traffic category. When voice is considered, one memory slot will be used for the previously observed queuing time $$q_{l_{previous}}^{voice}$$

of a voice packet at router (1) and another for the estimated jitter contribution $$\hat{\Delta}q_l^{voice}$$

introduced by router (1) for voice packets.

As set forth in the following equation, the estimated jitter at the router 24 is updated similarly to the queuing delay estimate in equation (4):

$$\hat{\Delta}q_l^{voice} = a \times \hat{\Delta}q_{l_{old}}^{voice} + (1 - \alpha) \times (q_1^{voice} - q_{l_{previous}}^{voice}) \quad (5)$$

Where: $\hat{\Delta}q_l^{voice}$ is the new estimate to be stored by router (1) for voice packet jitter contribution at that router;

$$\hat{\Delta}q_{l_{old}}^{voice}$$

is the previously stored estimate of voice packet jitter contribution at router (1); $q_l^{voice}$ is the last observed queuing time for a voice packet at router (1); and $$q_{l_{previous}}^{voice}$$

is the previously stored queuing time for a voice packet at router (1).

Upon triggering of the QoS estimation functionality, each respective access router 22 that is a candidate for the handoff of the remote terminal 12 will send three (3) probes to the correspondent node 14. In the preferred embodiment, the first two probes will be packets having the size and characteristics of voice packets and the third packet will be intended as a collector of information. The three packets are to be identified as a probe group through a common ID. The access router 22 is required to monitor the round-trip delay of the first two probes. Since the first two probes have identical characteristics to voice traffic in terms of size, interdeparture rate at the sender, and QoS class if any, they will be subject to transmission conditions identical to those of voice at intermediate hops in the fixed core network 26.

When the first voice-like probe packet reaches the access router of the correspondent node 14, the access router sends back a similar packet to the originating access router 22 after recording arrival and departure times. The same happens for the second voice-like probe packet. When the second probe is transmitted back, a reverse collector packet will be sent to the access router 22 for the same purposes as the forward collector packet. In addition, the forward collector packet is sent back to the access router 22 to provide it with the collected forward path information.

Each router 24 is required to monitor the queuing time $$q_l^{probe_1}$$

and $$q_l^{probe_2}$$

of the first two probing packets, and store them in memory. Preferentially, the queuing time estimate of the corresponding traffic category is not updated based on the probe queuing times since these times do not really reflect authentic traffic behavior. In addition, each router 24 has to monitor the transmission time ($s^{probe_1}/B_l$) and ($s^{probe_2}/B_l$) of probe packets 1 and 2 respectively from their link. Those values will be stored until the collector packet belonging to that probe group arrives at the router 24. Timeout functionalities will also be introduced to delete the monitored results in case the collector packet is lost and never arrives to collect that information.

Figure 4:
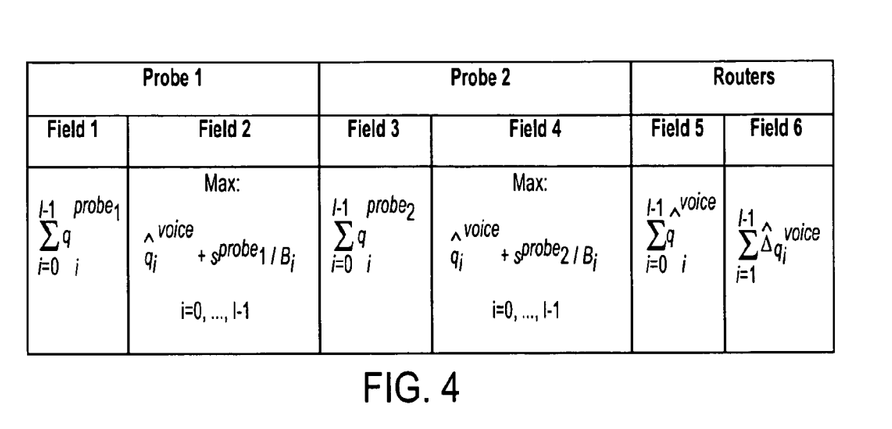
FIG. 4 illustrates parameters collected by a forward collector packet.

The collector packet coming from the source, i.e. access router 22, also referred to herein as the forward collector packet, since it is on the forward path towards the destination, will traverse routers 24 traversed by the previous two probe packets and collect the information set forth in FIG. 4 on probes 1 and 2 and the routers 24. Field 1 in FIG. 4 represents the cumulated sum of queuing delays recorded by the routers 24 for probe 1. Field 2 is the maximum observed delay from last packet bit arrival to last packet bit departure at intermediate routers 24 for probe 1. Field 3 and 4 in FIG. 4 are identical to 1 and 2 respectively except that they relate to probe 2. Field 5 is the cumulated sum of estimated queuing delays for this traffic category by the routers 24 along the path for packets of this traffic category. Field 6 is the cumulated sum of estimated packet jitter contributions by routers 24 along the path for packets of this traffic category.

The need for a collector packet comes from the impossibility of recording timing of packet transmission times within the packet itself since it would have departed. In addition, the recording process into the packet can distort the delay estimate since it introduces additional latencies. Since the categories of relevance in terms of QoS requirements are limited, this approach scales well both in terms of processing and memory space requirements at each router 24.

Figure 5:
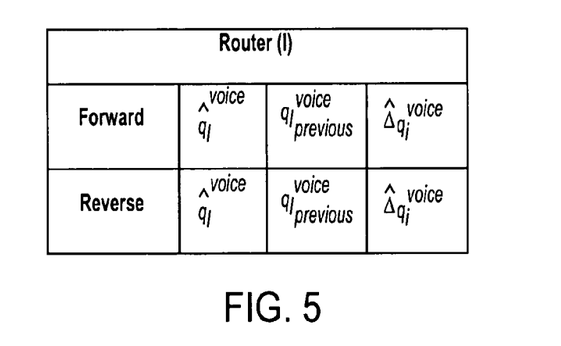
FIG. 5 illustrates the memory slot contents at each router.
Figure 6:
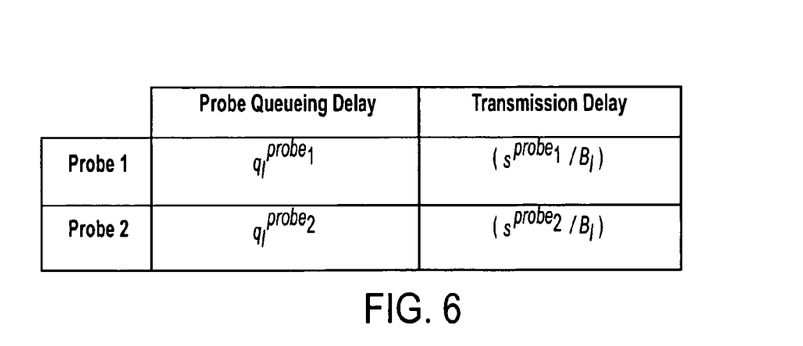
FIG. 6 illustrates the information monitored by each router for each probe group.

In order to keep track of the necessary information that the forward and reverse collector packets require, memory slots are used at each router 24. FIG. 5 illustrates the memory slots used and the contents of each memory slot. As set forth in FIG. 5, each router 24 has to keep track of each packet's queuing time. It also has to perform simple calculations of subtraction, multiplication and addition and update three memory slots for each packet it transmits. As further illustrated in FIG. 6, for each probe group each router 24 also has to monitor probe queuing delay and transmission delay.

After the forward and reverse collector packets have returned, the information they contain must be processed by the corresponding access router 22. As such, the information processing to estimate QoS over the core network 26 hop is performed at each respective candidate access router 24. After receiving the forward and reverse collector packets, each respective access router 22 will have the data illustrated in the table set forth in FIG. 7. As a result, the first and second probes received back at each access router 22 provide the data set forth in the table illustrated in FIG. 8.

The previous discussion on equation (2) showed that one-way delay can be rewritten in terms of a fixed component common to all packets:

$$C_{Fix} = A + t_0^k + \sum_{i=0}^{l-1} (s^k / B_i + d_i)$$

and a variable component $$C_{Var} = \sum_{i=0}^{l-1} q_i^k.$$

$C_{Fix}$ only needs to be calculated once and we propose to infer it from delay measurements on probes 1 and 2. A correct estimate of $C_{var}$ combined with the value of $C_{Fix}$ will provide a good estimate for one-way delay. For voice applications, if $$\sum_{i=0}^{l-1} q_i^{probe}$$

is subtracted from the measured one-way delay and $$\sum_{i=0}^{l-1} \hat{q}_i^{voice}$$

is added, it effectively adjusts the measure of one-way delay by a more accurate estimation of the variable component $C_{var}$.

Figure 7:
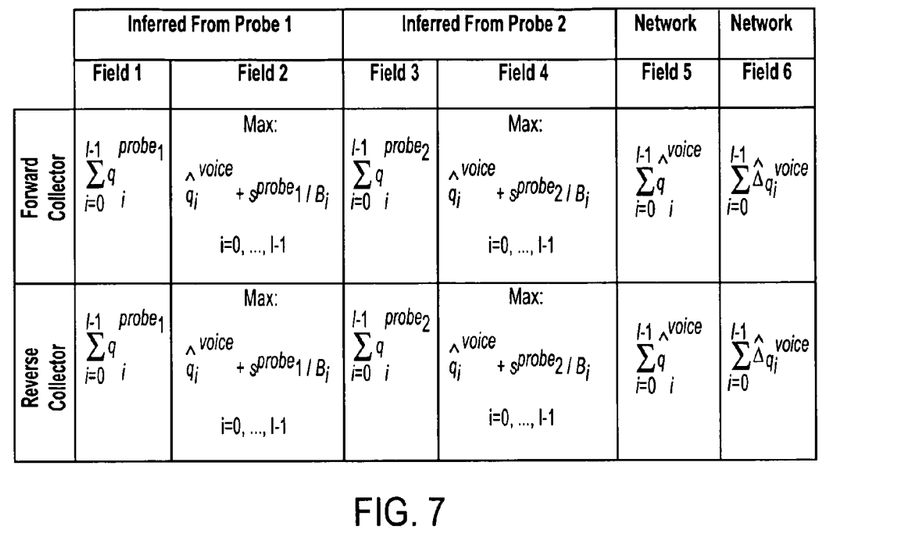
FIG. 7 illustrates parameters collected by the forward and reverse collector packets.
Figure 8:
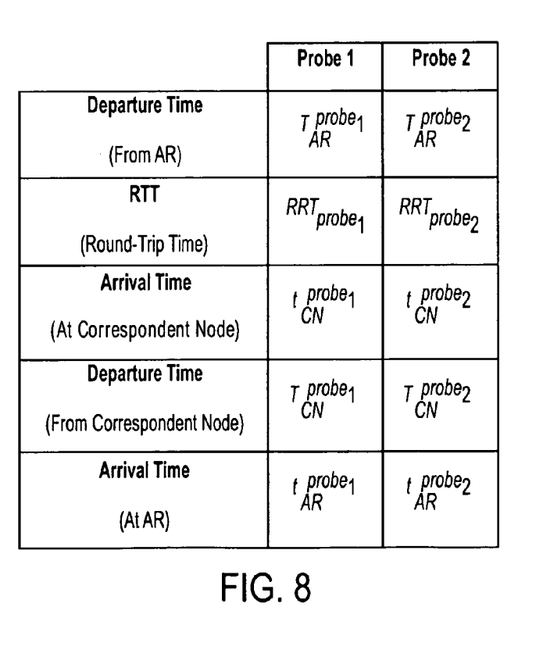
FIG. 8 illustrates the information that is provided by the first and second probing packets.

If the clocks at the access routers 22 and correspondent node 14 are not synchronized, we will have to rely on measured RTT at the access router 22 and divide by two. Equation (6) below is an expression for the estimated one-way delay using the values described in the tables set forth in FIGS. 7 and 8.

$$\hat{\tau} = \qquad (6)$$

$$1/4 \times \sum_{j=1}^{2} \left\{ RTT_{probe_j} - \left( \sum_{i=0}^{l-1} q_i^{probe_j} \right)_{forward} - \left( \sum_{i=0}^{l-1} q_i^{probe_j} \right)_{reverse} \right\} +$$

$$1/2 \times \left\{ \left( \sum_{i=0}^{l-1} \hat{q}_i^{voice} \right)_{forward} + \left( \sum_{i=0}^{l-1} \hat{q}_i^{voice} \right)_{reverse} \right\}$$

The above-referenced expression uses an averaging of the delays inferred from probes 1 and 2 respectively.

The disadvantage with using the RTT is that there is no consideration for asymmetric links that are often encountered in practical networks. Synchronized clocks at the access router 22 and the correspondent node 14 will provide a better way to address that problem. In that case, two values of delay can be defined, one for the forward and one for the reverse path, by once again using the values described in the tables set forth in FIGS. 7 and 8 as follows:

$$\hat{\tau}_{forward} = 1/2 \times \sum_{j=1}^{2} \left\{ \left( t_{CN}^{probe_j} - T_{AR}^{probe_j} \right) - \left( \sum_{i=0}^{l-1} q_i^{probe_j} \right)_{forward} \right\} + \qquad (7)$$

$$\left( \sum_{i=0}^{l-1} \hat{q}_i^{voice} \right)_{forward}$$

$$\hat{\tau}_{reverse} = 1/2 \times \sum_{j=1}^{2} \left\{ \left( t_{AR}^{probe_j} - T_{CN}^{probe_j} \right) - \left( \sum_{i=0}^{l-1} q_i^{probe_j} \right)_{reverse} \right\} + \qquad (8)$$

$$\left( \sum_{i=0}^{l-1} \hat{q}_i^{voice} \right)_{reverse}$$

In another preferred embodiment of the present invention the following equation can be used to estimate the one-way packet delay on the forward and reverse path:

$$\tau_n^{\hat{k}} = \left[1/2 \times \sum_{j=1}^{2}\left(t_{Dest}^{probe_j^k} - T_{Src}^{probe_j^k} - \sum_{l=0}^{n-1} q_l^{probe_j^k}\right)\right] + \left(\sum_{l=0}^{n-1} \hat{q}_l^{k,voice}\right)$$

The next item that needs to be estimated is jitter. As set forth above, equation (3) is used for estimating jitter delay at the routers 24 and is given by the following equations:

First definition of jitter:

$$\Delta t_l^{k,(k-1)} = t_0^k - t_0^{k-1} + \sum_{i=0}^{l-1} \Delta q_i^{k,k-1}.$$

Second definition of jitter:

$$\Delta t_l^k = \sqrt{\sum_{r=1}^{k}(t_l^r)^2/k - \left[\left(\sum_{r=1}^{k} t_l^r\right)/k\right]^2}$$

Based on this equation, the following two equations for forward and reverse jitters are used in one embodiment (corresponding to the first definition of jitter):

$$\Delta t_l^{k,(k-1)}{}_{forward} = T_{AR}^{probe_2} - T_{AR}^{probe_1} + \sum_{i=0}^{l-1} \hat{\Delta} q_i^{voice}{}_{forward} \quad (9)$$

$$\Delta t_l^{k,(k-1)}{}_{reverse} = T_{CN}^{probe_2} - T_{CN}^{probe_1} + \sum_{i=0}^{l-1} \hat{\Delta} q_i^{voice}{}_{reverse} \quad (10)$$

In another preferred embodiment of the present invention (corresponding to the second definition of jitter) the following equation can be used for forward and reverse jitter estimates:

$$\Delta t_n^k = \sqrt{\left(\tau_n^{\hat{k}}\right)^2/k + (1/k)\times\sum_{r=1}^{k-1}(\tau_n^{\hat{r}})^2 - (1/k^2)\times\left[\sum_{r=1}^{k-1}\tau_n^{\hat{r}} + \tau_n^{\hat{k}}\right]^2}$$

The next item that needs to be estimated is the minimum available bandwidth. The minimum available bandwidth corresponds to the maximum delay encountered at a router 24 since this delay can be due to either a queuing bottleneck or bandwidth bottleneck, therefore reflecting available bandwidth. The minimum available bandwidth is the only value needed to characterize the path bandwidth since path bandwidth is only as good as the worst link. The expressions of available bandwidth using values from the tables set forth in FIGS. 7 and 8 are:

$$Bav_{forward} = 1/2 \times \quad (11)$$

$$\sum_{j=1}^{2} s^{probe_j}/\text{Max}\left\{\left(q_i^{probe_j} + s^{probe_j}/B_i\right); i=0,\ldots,(l-1)\right\}_{forward}$$

-continued $$Bav_{reverse} = 1/2 \times \quad (12)$$

$$\sum_{j=1}^{2} s^{probe_j}/\text{Max}\left\{\left(q_i^{probe_j} + s^{probe_j}/B_i\right); i=0,\ldots,(l-1)\right\}_{reverse}$$

Notice that the above expression averages the available bandwidth estimated by probes 1 and 2 respectively.

In another preferred embodiment of the present invention, the following equation can be used to estimate the available bandwidth on the forward and reverse paths:

$$Bav^k = 1/2 \times \sum_{j=1}^{2} s^{probe_j^k}/\text{Max}\left\{\left(\hat{q}_{l,probe_j^k}^{voice} + s^{probe_j^k}/B_l\right); l=0,\ldots,(n-1)\right\}$$

Another preferred embodiment of the present invention is directed toward optimizing the QoS estimation technique by avoiding redundant measurements. The handoff triggering mechanism of each remote terminal 12 will cause QoS estimation through several access routers 22 and corresponding paths of the core network 26 to the same correspondent node 14. One optimization will be to identify common portions on these different paths of the core network 26 and avoid collecting their queuing information twice.

Another optimization technique that may be used in the present invention is to eliminate wireless hops 34 with bad signals with respect to the remote terminal 12 as candidates for handoff. Again, the end-to-end QoS estimation will include both layer 2 information and core network layer 3 QoS evaluation. However, since the path is only as good as its weakest link another optimization will be not to perform probing on the fixed core network 26 portion if the corresponding wireless hop 34 has a very bad signal, as compared to a threshold value.

Another optimization that is envisioned by the present invention relates to the monitoring that is conducted at the routers 24. The preferred embodiment of the present invention also can optimize the router 24 monitoring functionality of regular traffic from different categories. Instead of monitoring each packet for its queuing time and updating the queuing time estimate, the routers 24 can be set up to conduct monitoring at separated intervals, either regular or random. As such not every packet is monitored, a subset only is tracked and queuing time estimate adjustment is achieved based on this subset only. This will have the advantage of reducing the load on the router 24 resources.

As used herein, layer 2 measurements refer to parameters over the wireless hop 34, which preferentially include Bit Error Rate (BER), Frame Error Rate (FER), Signal-to-Noise Ratio (SNR), Carrier-to-Interference ratio (C/I), received wireless signal power, throughput in bits/sec (average, peak, minimum), goodput in bits/sec (average, peak, minimum). Goodput refers to throughput measurement of all payload bits transmitted, excluding headers), frame loss ratio, frame latency, and frame latency variation. Frame refers to the groups of bits at layer 2, the same as a packet at layer 3. The QoS estimation technique required for QoS-aware triggering has to be end-to-end and therefore has to extend from the remote terminal 12 all the way to the correspondent node 14. As illustrated in FIG. 1, the correspondent node 14 can either be fixed or mobile.

In the case of a fixed correspondent node 14, QoS estimation through the fixed core network 26 has to extend from the access router 22 connected to the remote terminal 12 to the correspondent node 14. The access router 22 collects QoS data about the fixed core network 26, QoS data about the wireless hop 34 from the access point to the remote terminal 12 and QoS data about the fixed hop 32 to the correspondent node 14. The access router 22 is responsible for combining these figures and producing an end-to-end QoS estimate about the path.

The layer 3 fixed core network 26 QoS parameters and the layer 2 wireless hop 34 QoS parameters are combined as follows: a threshold $T_{layer2}$ is set for signal power or SNR on the wireless hop 34. A QoS_Ranking figure is obtained for the fixed core network 26, which is obtained as generally set forth below. Collected layer 2 QoS data have first to comply with threshold $T_{layer2}$. Only then is selection performed on the QoS_Ranking value of the hop over the fixed core network 26. Another approach can be to map layer 2 QoS parameters of the wireless hop 34 into layer 3 QoS parameters and combine the wireless hop 34 and fixed hop layer 3 QoS before obtaining the QoS_Ranking value for the path. Once it is obtained, path selection will be solely based on the $QoS_{l3}$ Ranking parameters.

Figure 9:
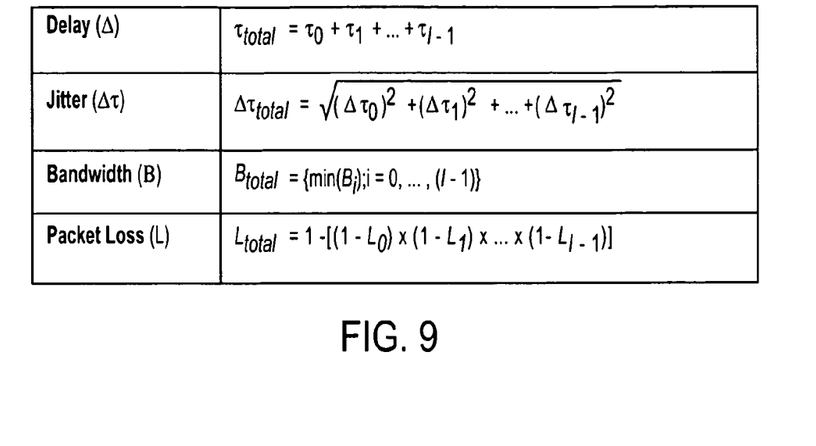
FIG. 9 illustrates the QoS parameters combining rules.

Rules for combining delay, jitter, bandwidth and packet loss are defined as set forth below and FIG. 9. For wireless correspondent nodes 14, the measurement is performed between the access routers 22 that are connected to the remote terminal 12 and the correspondent nodes 14 and wireless link layer 2 QoS has to be collected on two wireless hops 34, the remote terminal 12 to its access point hop and the correspondent node 14 to its access point hop.

Figure 10:
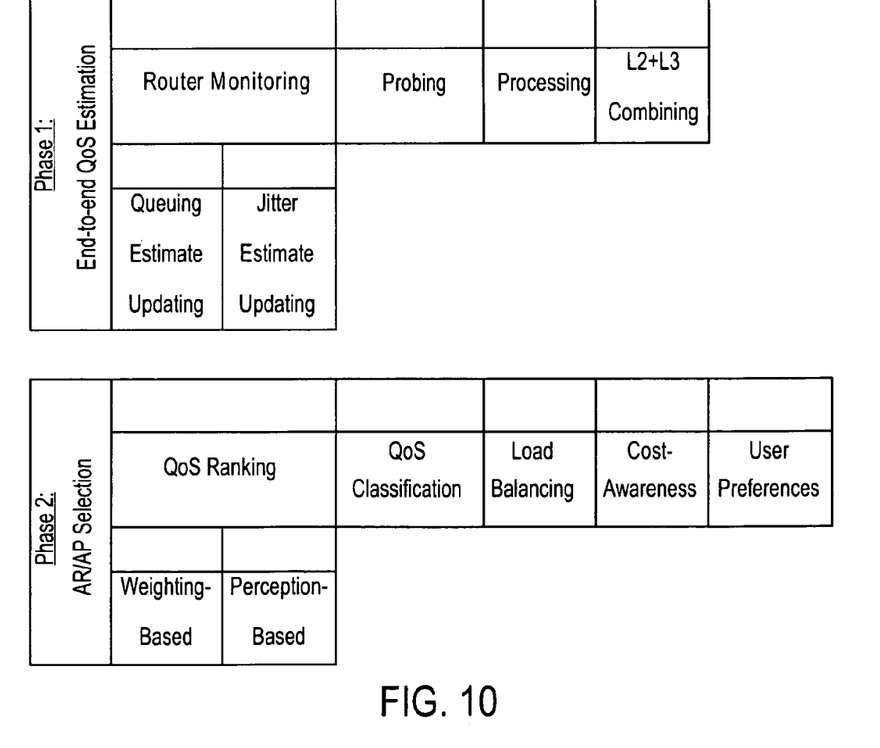
FIG. 10 illustrates phase one and phase two of the QoS aware handoff trigger.

As illustrated in FIG. 10, the discussion above defined the QoS estimation algorithm and how it is used in the preferred embodiment of the present invention. This is referred to as phase one of the QoS-aware handoff trigger, which is generally illustrated in FIG. 10. Phase two, which is the next step, is access router 22 and access point selection based on the end-to-end QoS parameter estimates.

In phase two, an access router 22, at a particular access point, is selected based on a QoS_Ranking parameter that is obtained using either a weighting based ranking or a perception based ranking. Once the QoS_Ranking parameter is obtained each access router 22 at each access point is classified or ranked in the order of providing the best QoS to the remote terminal 12. As further illustrated in FIG. 10, then load balancing is taken into consideration and finally, cost awareness and user preferences may also be taken into consideration when making the handoff trigger decision. Ultimately a handoff trigger decision is made based on all of the considerations outlined herein.

As generally set forth above, in the preferred embodiment of the present invention, the selection algorithm will preferentially also include a load balancing functionality. The reason is to avoid an unusually higher performance base station 16 to be overwhelmed by handoffs, especially under the case of several remote terminals 12 within the same radio coverage area using the same fixed core network 26. The load balancing function is based on a randomizer, such that given a set of n access points with acceptable QoS and corresponding n QoS_Ranking values, then select access points (i) with probability:

$$(QoS\_Ranking_i) / \sum_{j=1}^{n} QoS\_Ranking_j \quad (5)$$

The preferred handoff triggering method is application specific, meaning that the trigger takes into consideration the requirements of a specific application and attempts to satisfy it by proper triggering. All the methods described assume the existence of a correspondent node 14 to which traffic is to be directed after handoff and QoS measurements will be directed towards that correspondent node 14.

The rationale is that different applications have different QoS requirements and it is not trivial to find a common set of requirements satisfying all applications at the same time and that we can input into the handoff triggering algorithm. The preferred embodiment of the present invention focuses on limiting the scope of requirements to voice alone, especially since such a service will be a minimum objective for future generation mobile networks. Future work will aim at identifying a methodology for grouping different application QoS requirements into one set over which to base the trigger.

The case may occur that no voice call is ongoing at handoff time. The correspondent node 14 is therefore unidentified. This scenario is left out from the scope of the present report. However a simple temporary solution is to switch back to regular layer 2 QoS measurements over the wireless link 34 much like the current wireless networks.

Referring to FIG. 10, phase two of the present invention discloses a method for providing a triggering mechanism in an IP wireless communication system 10. This method includes the steps of probing a plurality of communication paths between a mobile terminal and a correspondent node to obtain at least one QoS parameter associated with each said communication path; identifying each communication path that provides a predetermined acceptable level of performance; and generating a handoff trigger to the communication path that provides the highest level of performance to the remote terminal 12.

Yet another preferred embodiment of phase two discloses a method and system for providing a triggering mechanism for a mobile terminal in an all-IP wireless communication system. The preferred method comprises the steps of: probing a plurality of access points with the remote terminal 12 to obtain at least one QoS parameter that is defined by a communication traffic path between the remote terminal 12 and a correspondent node 14; classifying each access point into a group that passes a predefined QoS requirement associated with the QoS parameter; ranking the group according to a predicted level of performance by quantifying the QoS parameter; and generating a handoff trigger directing the remote terminal 12 to hand off to the access point providing the highest QoS to the remote terminal 12.

In the preferred embodiment, the at least one QoS parameter is selected from a group of layer 3 QoS parameters consisting of: packet delay, packet jitter, packet loss and bandwidth on an end-to-end path. In addition, in one embodiment the first group is ranked using a weighted-based ranking. In yet another embodiment, the first group is ranked using a perception-based ranking.

For a detailed discussion of phase two, which involves the access router 22 and access point selection, please refer to co-pending U.S. application Ser. No.: 09/965,437 entitled Layer Three Quality of Service Aware Trigger, which is incorporated herein by reference in its entirety.

While the invention has been described in its currently best-known modes of operation and embodiments, other modes, embodiments and advantages of the present invention will be apparent to those skilled in the art and are contemplated herein.

What is claimed is:

1. A method of estimating QoS in an IP network, comprising:
   generating at least one QoS estimate by
      generating at least a first and second probing packet with an access router from at least one access point;
      sending said first and second probing packets from said at least one access point over a fixed core network having a plurality of routers to a correspondent access router and then back to said at least one access router;
      sending at least one collector packet to follow said first and second probing packets to gather at least one predetermined QoS parameter from said routers after said first and second probing packets leave said routers, the first and second probing packets being used to generate the at least one QoS parameter gathered by the at least one collector packet while the first and second probing packets from and back to the access router; and
      processing said at least one QoS parameter with said at least one access router to determine a level of QoS experienced by said at least one access router; and
   making a handoff trigger decision based on the at least one QoS estimate.

2. The method of claim 1, wherein said at least one collector packet comprises a forward collector packet for gathering said at least one QoS parameter from said routers while said first and second probing packets are traveling from said at least one access router to said correspondent access router.

3. The method of claim 1, wherein said at least one collector packet comprises a reverse collector packet for gathering said at least one QoS parameter from said routers while said first and second probing packets are traveling from said correspondent access router to said at least one access router.

4. The method of claim 1, further comprising the step of recording a packet queuing delay based on each said probing packet at each said router.

5. The method of claim 1, further comprising the step of recording a packet transmission time based on each said probing packet at each said router.

6. The method of claim 1, wherein said at least one QoS parameter comprises a cumulated sum of queuing delays experienced by said first and second probing packets at each respective router.

7. The method of claim 1, wherein said at least one QoS parameter comprises a transmission time of said first and second probing packets from said respective routers.

8. The method of claim 1, wherein said at least one QoS parameter comprise a cumulated sum of the current packet queuing delay experienced at said routers by said first and second probing packets.

9. The method of claim 1, wherein said first and second probing packets are formed having similar characteristics as voice traffic packets.

10. The method of claim 1, wherein said at least one QoS parameter is used to estimate one-way packet delay.

11. The method of claim 1, wherein said at least one QoS parameter is used to estimate available bandwidth.

12. The method of claim 1, wherein said at least one QoS parameter is used to estimate packet jitter.

13. The method of claim 1, further comprising the step of avoiding the gathering of said at least one QoS parameters by said collector packets for each router already visited by a first and second probing packet from another access router.

14. A method of estimating QoS in an IP network, comprising:
   sending a first and second probing packet across a fixed core network from a plurality of candidate access routers to a correspondent access router;
   sending a forward collector packet that follows said first and second probing packet across said fixed core network to said correspondent access router, wherein said forward collector packet collects a predetermined set of parameters from said routers;
   sending said first and second probing packet and said forward collector packet back to said originating access router from said correspondent access router;
   sending a reverse collector packet that follows said first and second probing packet across said fixed core network to said originating access router from said correspondent access router, wherein said reverse collector packet collects a second predetermined set of parameters from said routers, such that the first and second probing packets are used to generate the at least one predetermined set of parameters gathered by the forward and reverse collective packets while the first and second probing packets travel from and back to said originating access router;
   processing the first and second predetermined set of parameters from said forward and reverse collector packets to determine a level of QoS experienced by said candidate access router; and
   making a handoff trigger decision based on the level of QoS experienced by said candidate access router.

15. The method of claim 14, further comprising the step of recording a packet queuing delay at each said router.

16. The method of claim 14, further comprising the step of recording a packet transmission time at each said router.

17. The method of claim 14, wherein said first and second predetermined set of parameters include a cumulated sum of queuing delays experienced by said first and second probing packets at each said respective router.

18. The method of claim 14, wherein said first and second predetermined set of parameters include a transmission time of said first and second probing packets from each said respective router.

19. The method of claim 14, wherein said first and second predetermined set of parameters include a cumulated sum of the current packet queuing delay at said routers.

20. The method of claim 14, wherein said first and second probing packets are formed with the same characteristics as voice traffic packets.

21. The method of claim 14, wherein said first and second predetermined set of parameters are used to estimate one-way packet delay.

22. The method of claim 14, wherein said first and second predetermined set of parameters are used to estimate available bandwidth.

23. The method of claim 14, wherein said first and second predetermined set of parameters are used to estimate packet jitter.

24. The method of claim 14, further comprising the step of avoiding the gathering of said first predetermined set of parameters for routers already visited by a first and second probing packet from another access router.

25. The method of claim 14, further comprising the step of avoiding the gathering of said second predetermined set of parameters for routers already visited by a first and second probing packet from another access router.

26. A method of estimating QoS for making a handoff trigger decision for a remote terminal in a wireless IP network, comprising:
generating at least a first and second probing packet with an access router from a plurality of access points;
sending said first and second probing packets from said access points over a fixed core network having a plurality of routers to a correspondent access router and then back to said access routers;
sending at least one collector packet to follow said first and second probing packets to gather at least one predetermined QoS parameter from said routers after said first and second probing packets leave said routers, the first and second probing packets being used to generate the at least one predetermined QoS parameter gathered by the at least one collector packet while the first and second probing packets travel from and back the access routers;
processing said at least one QoS parameter with said access routers; and
making said handoff trigger decision.

27. The method of claim 26, further comprising the step of considering at least one layer two QoS parameter from said access point to said remote terminal when making said handoff trigger decision.

28. The method of claim 27, wherein each said access point not having a signal strength for a wireless hop above an acceptable predetermined threshold is removed from consideration when making said handoff trigger decision.

29. The method of claim 27, wherein said layer two QoS parameters may be selected from a group of parameters consisting of Bit Error Rate (BER), Frame Error Rate (FER), -Signal-to-Noise Ratio (SNR), Carrier-to-Interference ratio (C/I), received wireless signal power, throughput in bits/sec (average, peak, minimum), goodput in bits/sec (average, peak, minimum), frame loss ratio, frame latency, and frame latency variation.

30. The method of claim 26, wherein said at least one collector packet comprises a forward collector packet for gathering said at least one QoS parameter from said routers while said first and second probing packets are traveling from said access router to said correspondent access router.

31. The method of claim 26, wherein said at least one collector packet comprises a reverse collector packet for gathering said at least one QoS parameter from said routers while said first and second probing packets are traveling from said correspondent access router to said access router.

32. The method of claim 26, further comprising the step of recording a packet queuing delay based on each said probing packet at each said router.

33. The method of claim 26, further comprising the step of recording a packet transmission time based on each said probing packet at each said router.

34. The method of claim 26, wherein said at least one QoS parameter comprises a cumulated sum of queuing delays experienced by said first and second probing packets at each respective router.

35. The method of claim 26, wherein said at least one QoS parameter comprises a transmission time of said first and second probing packets from said respective routers.

36. The method of claim 26, wherein said at least one QoS parameter comprise a cumulated sum of the current packet queuing delay experienced at said routers by said first and second probing packets.

37. The method of claim 26, wherein said first and second probing packets are formed having similar characteristics as voice traffic packets.

38. The method of claim 26, wherein said at least one QoS parameter is used to estimate one-way packet delay to form a basis for said handoff trigger decision.

39. The method of claim 26, wherein said at least one QoS parameter is used to estimate available bandwidth to form a basis for said handoff trigger decision.

40. The method of claim 26, wherein said at least one QoS parameter is used to estimate packet jitter to form a basis for said handoff trigger decision.

41. The method of claim 26, further comprising the step of avoiding the gathering of said at least one QoS parameters by said collector packets for each router already visited by said first and second probing packet from another access router.

42. A method of estimating QoS for making a handoff trigger decision for a remote terminal in a wireless IP network, comprising the steps of:
sending a first and second probing packet across a fixed core network from a plurality of candidate access routers to a correspondent access router;
sending a forward collector packet that follows said first and second probing packet across said fixed core network to said correspondent access router, wherein said forward collector packet collects a predetermined set of parameters from said routers;
sending said first and second probing packet and said forward collector packet back to said originating access router from said correspondent access router;
sending a reverse collector packet that follows said first and second probing packet across said fixed core network to said originating access router from said correspondent access router, wherein said reverse collector packet collects a second predetermined set of parameters from said routers, such that the first and second probing packets are used to generate the at least one predetermined set of parameters gathered by the forward and reverse collector packets while the first and second probing packets travel to and back from said correspondent access router;
processing the first and second predetermined set of parameters from said forward and reverse collector packets; and
making a handoff trigger decision based on the processed first and second predetermined set of parameters.

43. The method of claim 42, further comprising the step of recording a packet queuing delay at each said router.

44. The method of claim 42, further comprising the step of recording a packet transmission time at each said router.

45. The method of claim 42, wherein said first and second predetermined set of parameters include a cumulated sum of queuing delays experienced by said first and second probing packets at each said respective router.

46. The method of claim 42, wherein said first and second predetermined set of parameters include a transmission time of said first and second probing packets from each said respective router.

47. The method of claim 42, wherein said first and second predetermined set of parameters include a cumulated sum of the current packet queuing delay at said routers.

48. The method of claim 42, wherein said first and second probing packets are formed with the same characteristics as voice traffic packets.

49. The method of claim 42, wherein said first and second predetermined set of parameters are used to estimate one-way packet delay.

50. The method of claim 42, wherein said first and second predetermined set of parameters are used to estimate available bandwidth.

51. The method of claim 42, wherein said first and second predetermined set of parameters are used to estimate packet jitter.

52. The method of claim 42, further comprising the step of avoiding the gathering of said first predetermined set of parameters for routers already visited by a first and second probing packet from another access router.

53. The method of claim 42, further comprising the step of avoiding the gathering of said second predetermined set of parameters for routers already visited by a first and second probing packet from another access router.

54. An article of manufacture having one or more recordable media storing instructions thereon which, when executed by a system, cause the system to perform a method of estimating QoS in an IP network comprising:
   generating at least one QoS estimate by
      generating at least a first and second probing packet with an access router from at least one access point;
      sending said first and second probing packets from said at least one access point over a fixed core network having a plurality of routers to a correspondent access router and then back to said at least one access router;
      sending at least one collector packet to follow said first and second probing packets to gather at least one predetermined QoS parameter from said routers after said first and second probing packets leave said routers, the first and second probing packets being used to generate the at least one QoS parameter gathered by the at least one collective packet while the first and second probing packets travel from and back to said access router;
      processing said at least one QoS parameter with said at least one access router to determine a level of QoS experienced by said at least one access router; and
   making a handoff trigger decision based on the at least one QoS estimate.

* * * * *